Aug. 4, 1931.  E. E. COOPER  1,817,802
FAUCET LOCK AND COVER
Filed May 11, 1929   2 Sheets-Sheet 2
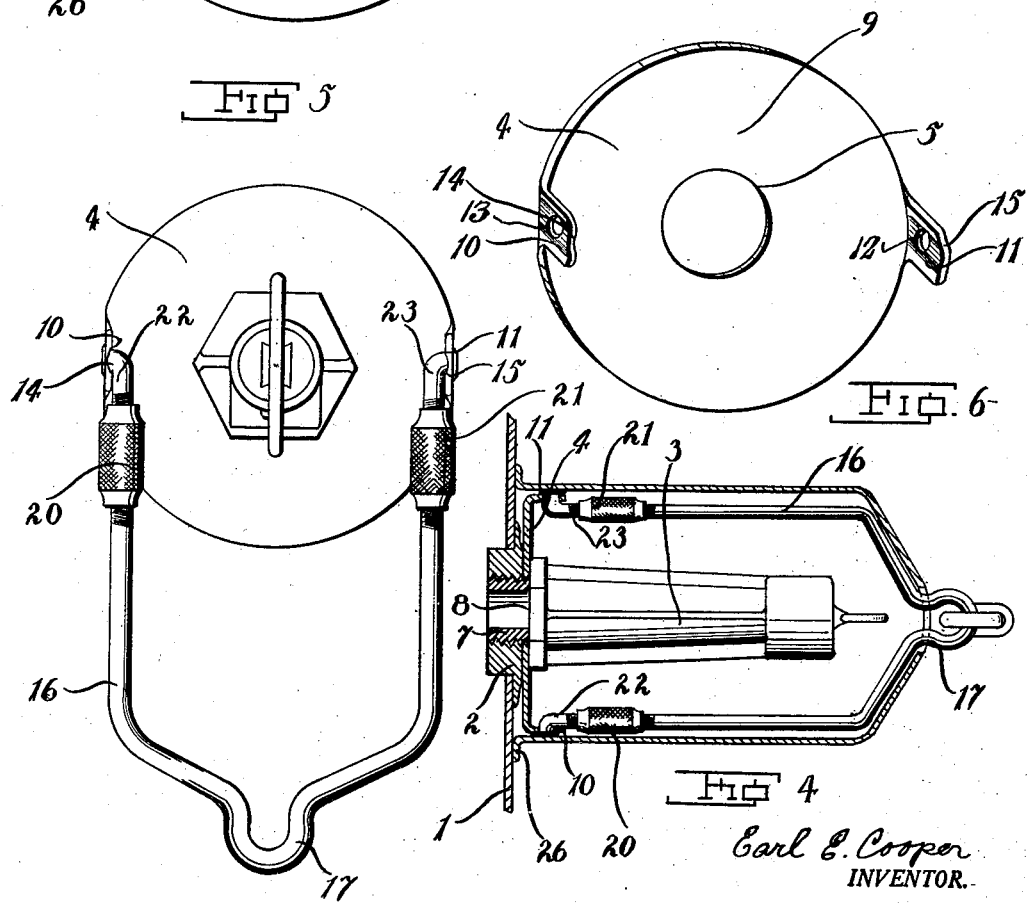

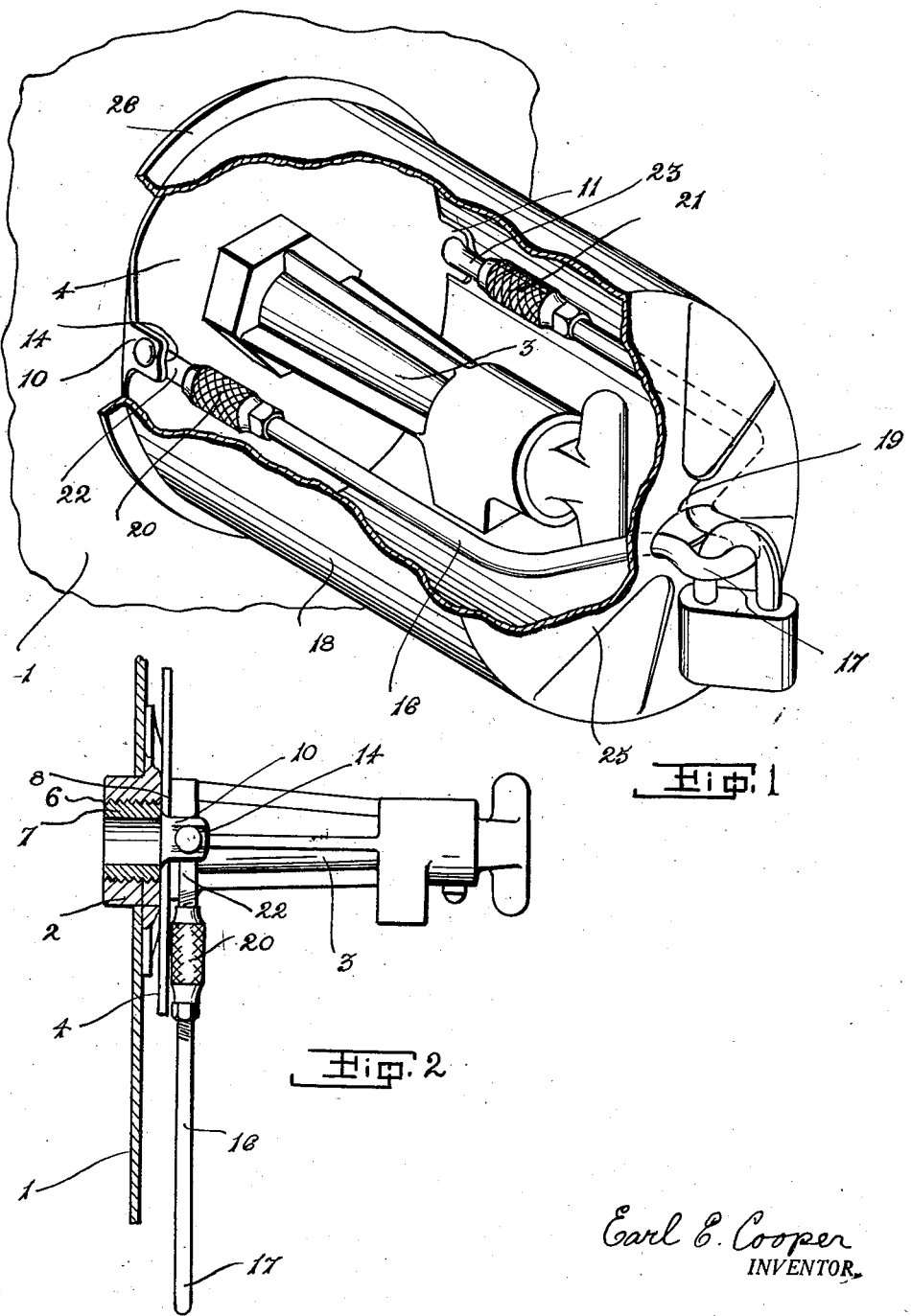

Patented Aug. 4, 1931

1,817,802

UNITED STATES PATENT OFFICE

EARL E. COOPER, OF DECATUR, ILLINOIS, ASSIGNOR TO CHAMBERS, BERING, QUINLAN CO., OF DECATUR, ILLINOIS, A CORPORATION

FAUCET LOCK AND COVER

Application filed May 11, 1929. Serial No. 362,307.

My invention relates to protectors for faucets in use in connection with fluid containers and the like; an object being in this device to lock and cover the faucet to avoid any chance of tampering therewith or undetected access to the container through the faucet or its connections with the container.

A particular object of my invention is to provide a faucet lock and cover that furnishes complete protection for the faucet without exposing to view any part thereof or leaving any part accessible to tamper with.

A further object is to furnish a complete protection for a fluid container faucet which may be economically made and distributed for general use, convenient to manipulate for normal daily use and positive in its protection.

I attain the objects desired in the device described in the annexed specifications, recited in the claims and illustrated in the drawings herewith connected.

In the drawings like reference numerals indicate like parts in the several figures.

Referring to the figures:

Fig. 1 is a perspective of the faucet lock and cover of my invention showing in a cutaway the details of the assembled relation of the parts of my invention and their connection with the container bushing and wall.

Fig. 2 is a side view of my invention shown operatively connected with a container wall and a threaded bushing therein.

Fig. 3 is a top view of the plate disc and yoke of my invention with the yoke turned down and a faucet exposed to view.

Fig. 4 is a longitudinal section of the faucet cover or canopy shown in its fitting relation with the yoke and plate disc and exposing to view a faucet showing the manner in which the faucet holds the disc down on the bushing of the container.

Fig. 5 is a top view of the cover member or canopy forming a part of my invention.

Fig. 6 is an oblique view disclosing the details of construction of the plate disc member having upturned peripheral ears for the engagement of the yoke member.

Fig. 7 is a longitudinal section of one of the turn buckles showing its fitting relation with the yoke arm and showing how it may adjust the length of the arm through right and left threads on both.

Referring now in detail to the description and method of using my faucet lock and cover I provide in operative connection with a fluid container —1— a threaded bushing —2— and a faucet —3—, a faucet lock and cover including a plate disc —4— having a central hole —5— adapted to register snugly over the threaded hole —6— of bushing —2— and receive the threaded shank —7— of faucet —3— where faucet —3— when screwed down tight in bushing —2— has its shoulder —8— pressing on the inner skirt edge —9— of the plate disc —4—.

Disc —4— has a pair of integral peripheral upturned ears —10— and —11— respectively provided with holes —12— and —13— registering respectively in integral offsets —14— and —15— of the ears.

An adjustable yoke —16— springily and pivotally engages holes —12— and —13— of ears —10— and —11— of plate —4— in a manner permitting integral offsets —14— and —15— to resiliently hold the yoke in an extended position when it is not desired to pivotally turn this yoke down out of the way as shown in Figure 2. This yoke has an outer integral terminal loop —17— of relatively small arc and adapted to receive the neck of a padlock when in normal use.

A hood or canopy —18— is provided with an outer terminal slot —19— and adapted to completely cover the yoke —16— and disc —4— and rest against bushing —2— or container —1— when in use as a cover protection for the faucet —3—.

When this canopy is slipped down over the yoke —16— and disc —4— then the loop —17— extends through slot —19— of hood —18— far enough to permit a padlock to engage loop —17— outside of hood —18— and thus lock the hood snugly fitting in its position covering the yoke, the disc and the faucet.

In order to be able to adjust the length of yoke —16— I provide turn buckle —20— and —21— forming threaded connection between the loop end and the two pivoted ends —22— and —23— of the yoke. The turn buckles are threaded with right and left integral threads at their opposite ends to engage corresponding right and left threads of the connected ends of the yoke.

Adjustments may be made in one or both sides of the yoke at a time as desired.

It will be noted that the canopy —18— has a bottom flange —26— to provide more protection and a wider base of support for it, and that the top or outer end of the canopy has integral ribs —25— to give it additional strength.

It will be evident to those who are familiar with the art to which this faucet lock and cover pertains that the spirit and scope of this invention will admit of certain minor changes in some of its details without departing from the novelty above disclosed and recited in the claims which follow.

Having thus described the nature of my invention what I claim is:

1. A faucet lock and cover for container faucets, comprising in combination a collar engaged by a faucet on the container, a yoke pivoted to said collar and a slotted cover engaging the yoke and collar; said yoke having an end loop extending through said slot in the cover to receive a padlock through the loop outside the cover.

2. A faucet lock and cover for protecting container faucets secured to the container, comprising a collar detachably engaged between the faucet and container, a yoke having adjustable arms and a terminal loop pivoted to the collar and a slotted cover encompassing and engaging the yoke and collar said loop of the yoke extending thru the slot in the cover to receive a padlock thru the loop in the yoke outside of the cover to prevent access to the container.

3. A faucet lock and cover comprising a central apertured disc operatively engaged by a faucet, an adjustable yoke provided with a relatively small integral terminal loop pivotally secured to the disc and a canopy member detachably covering the yoke and disc and provided with an outer terminal slot for said loop to pass therethrough; and lock means for engaging the loop for the protection of the faucet.

4. A faucet lock and cover for the protection of barrel faucets and comprising a disc having a central opening for engaging a faucet about the threaded end, integral peripheral bale engaging ears on the disc, an adjustable bale engaging the ears, threaded and provided with turn buckles and an integral top terminal loop thereof and a cover having a top terminal slot; said cover providing a canopy over the bale and disc and said top terminal slot adapted to receive said loop in the bale for locking a padlock in the loop outside the cover for the protection of the faucet when in normal operation.

5. A faucet lock and cover comprising a collar plate, having a central opening therein, integral perforated ears thereon, and an adjustable loop operatively engaging the collar through said perforations in said ears, a detachable hood provided at the top with an elongated slot and adapted to normally rest over said loop and said collar and receive the top of said loop therethrough for inserting a lock through the loop and said collar provided with a central aperture for accommodating the threaded shank of a faucet when in normal operation; whereby said faucet may hold said collar down against a threaded bung hole in a container; and whereby said hood may cover said faucet and be locked over it.

6. A faucet lock and cover comprising a collar, integral angular channeled ears thereon provided with an opening through each, an adjustable threaded yoke engaging said ears through said openings and terminating at the outer end in a relatively smaller loop said yoke provided with turn buckles operating on said threads for adjusting the length of said yoke on one or both arms thereof at the same time; said yoke pivotally and resiliently engaging said ears and said collar normally held into engagement with a threaded collar of a barrel by a faucet screwed into said threads; a hood having a terminal slot and entirely encompassing said collar and said yoke; said terminal loop of said yoke extending through said terminal slot of the hood when the hood is in normal use; whereby said faucet may be covered and the hood may be locked in place by inserting a lock through said protruding loop of the yoke.

7. A faucet lock and cover comprising in cooperative combination a container a threaded bushing secured in the wall thereof, a collar provided with a central opening and a pair of upturned integral peripheral ears normally registering on and in line with said threaded bushing and held into engagement therewith by a faucet screwed into the bushing against the collar, a yoke pivotally engaging said ears of the collar and provided with threaded arms and a turn buckle on each for making adjustment in the length thereof and terminating at the upper end in a relatively small integral loop; a hood covering said collar, yoke and faucet and provided with an outer terminal slot for accommodating said outer terminal loop of the yoke; said loop when in normal use extending through said slot in the hood and normally engaged by a padlock extending through the loop for the coverage and protection of the faucet to prevent access to the container.

8. A faucet lock and cover for containers having a threaded bushing in the container wall, comprising in combination a detachable collar having upturned peripheral ears and a central opening adapted to accommodate a barrel faucet and be secured to the barrel thereby, an adjustable yoke pivotally engaging said ears of the collar, provided with threaded arms and turn buckles and a relatively small outer terminal loop, a detachable hood provided with an outer terminal slot; said hood adapted to encompass and cover said collar and faucet and engage said terminal loop of the yoke adapted to extend through said slot of the hood and said hood adapted to be engaged by a padlock through said loop to prevent access to the container through the faucet.

9. A faucet lock and cover comprising in combination a perforated collar having upturned peripheral ears, a pivoted yoke threaded and provided with turn buckle adjustments resiliently engaging said ears and provided with an integral terminal loop of relatively smaller arc than the general arc of the yoke; said collar adapted to be substantially held in registry with an interiorly threaded bushing of a container by a faucet screwed into the bushing against the collar; and a hood for detachably covering said collar, yoke and faucet, for the protection of the faucet and provided with an outer terminal slot for receiving said terminal loop of the yoke; said terminal loop when extending through said slot of the hood adapted to receive and engage a padlock.

In witness whereof, I hereunto set my hand and seal this 21st day of March, 1929.

EARL E. COOPER.